(No Model.)
K. H. STIVASON.
PIPE LINE FOR CARRYING GAS.
No. 317,880.  Patented May 12, 1885.
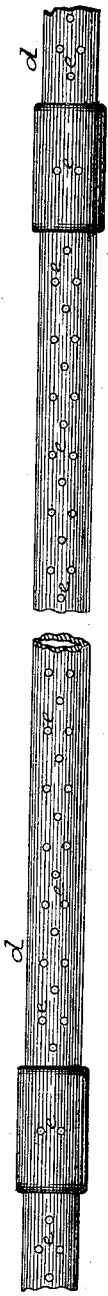
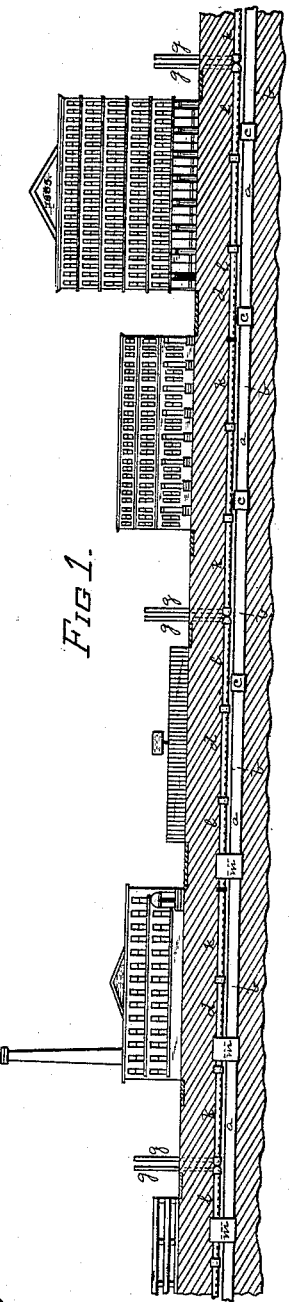
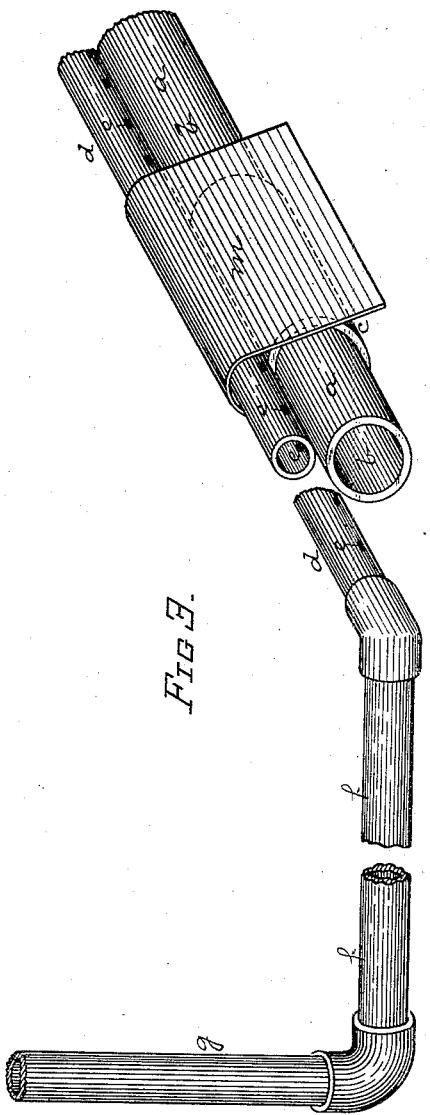

UNITED STATES PATENT OFFICE.

KENNEDY H. STIVASON, OF KITTANNING, PENNSYLVANIA.

PIPE-LINE FOR CARRYING GAS.

SPECIFICATION forming part of Letters Patent No. 317,880, dated May 12, 1885.

Application filed February 24, 1885. (No model.)

*To all whom it may concern:*

Be it known that I, KENNEDY H. STIVASON, of Kittanning, in the county of Armstrong and State of Pennsylvania, have invented a new and useful Improvement in Pipe-Lines for Carrying Gas; and I do hereby declare the following to be a full, clear, and exact description thereof.

My invention relates to lines for carrying gas under pressure through the streets of cities, having special reference to lines for carrying what is termed "natural gas," this gas being obtained through Artesian wells bored in certain localities, and being conducted therefrom through pipe-lines to the places of consumption, the gas being now employed to a large extent in many cities for heating and manufacturing purposes. This gas is found to be exceedingly subtile, so that it is almost impossible to form a tight joint with the ordinary threaded joints employed for wrought-metal tubing. The gas is highly explosive, so that where it leaks through the pipes it is liable to gather in the sewers or in the cellars of adjacent buildings and explode, and very serious accidents have occurred from this cause.

The object of my invention is to provide a means for collecting and carrying off any gas leaking from the main line in which the gas is carried under high pressure, and for detecting and locating the locality in which any serious leakage of the main line occurs.

It consists, essentially, in combining with the main line a supplemental pipe-line independent from the main line and supported above and close to the main line and provided with openings therein for the entrance of any gas which may escape from the main line, the escaping gas passing into the supplemental line, and being conducted therefrom through pipes to suitable points of escape above the ground.

It also consists in forming this supplemental line in short sections leading above the ground at intervals in such manner that in case of serious leakage in the main line the point of leakage can be approximately located and the leak repaired.

To enable others skilled in the art to make and use my invention, I will describe the same, referring to the accompanying drawings, in which—

Figure 1 represents a pipe-line embodying my invention. Fig. 2 represents a section of the supplemental pipe-line, showing the perforations therein, and Fig. 3 is a perspective view of part of the line, showing the cowl or cover employed for holding the two lines in proper position and catching any leakage from the main line and directing it into the supplemental line.

Like letters of reference indicate like parts in each.

The main line $a$ of tubing, carrying the gas under high pressure, is formed of the sections of tubing $b\ b$, connected by coupling-sockets $c\ c$, these sockets being of any approved form, either screw-sockets or other form adapted to prevent the leakage of the gas through the joints.

Extending above and close to the main line $a$ is the supplemental line $d$, which is formed of tubing of small diameter, pipe from one inch to two inches in diameter being amply sufficient for the purpose. This supplemental line of tubing is perforated along the sides and under surface, in order to permit the gas escaping from the main line to enter into the supplemental line, the perforations or openings $e$ of the supplemental line being made sufficiently large to prevent their being choked up by the earth packed around the tubing after it is laid, the openings being either slots or other form of perforations, and being formed sufficiently close together to provide an easy entrance of any escaping gas into the supplemental line. Both the pipe and the coupling-sockets of the supplemental line may be thus perforated. As the gas carried through the main line is exceedingly light, as soon as it escapes from the main line it will pass up over the main line and enter through these openings into the supplemental line, from which it is conducted by suitable pipes above the ground and permitted to escape, and as there is much freer egress through the supplemental-pipe line than through the surrounding earth there is no liability of the gas passing through the ground into adjacent sewers or buildings.

Where the main line extends under the street I provide pipes at suitable intervals, extending from the supplemental line to the curbing of the street, as at $f$, and vertical pipes leading therefrom a suitable distance above the ground, as at $g$, to allow the escape of any gas entering into the supplemental line.

The supplemental line $d$ may be a continuous line extending along the top of the main line, and having these vent-pipes leading therefrom at suitable intervals; but I prefer the form shown in the drawings, in which the supplemental line is formed in short sections, and each section has a single vent-pipe, $f g$, so that in case of any serious leakage in the main line the locality of said leakage may be determined by the amount of gas escaping from any one of these vent-pipes, and only that portion of the line opened for the repair of the leak in the main line. For example, where the pipe-line extends through the streets of a city I generally provide two such short supplemental lines between each street and each alley, the ends of the supplemental lines between the said street and alley being formed close to each other, but having no communication, and the vent-pipe from the line leading to the surface of the street at each cross street or alley, such vent-pipes leading up from the pipe-line together, and being carried a suitable distance above the street, as illustrated. This is fully illustrated in the drawings, in which a short supplemental line, $k$, leads from the center of the cross-streets in one direction to said street, and the short supplemental line $l$ leads in the other direction to the next street or alley, these lines meeting similar lines leading in the opposite direction, and the vent-pipes $f g$ of each line where they meet being carried up through the street. These vent-pipes can be tested at suitable times to determine the amount of gas escaping through them, and in case the vent-pipe of any one of these short supplemental lines indicates an unusual escape of gas the portion of the pipe-line along which it extends can be opened, and the leak in the main line thus repaired. As the earth is packed closely around these lines of pipe, and the supplemental lines afford free escape for the gas, it is evident that any gas escaping from the main line will find its natural escape to the surface of the ground through these supplemental lines, and therefore it will not generally be necessary to provide any means whatever for directing the gas into the supplemental line. As, however, the principal points of leakage in the main line are at the joints or couplings, and it is desirable to hold the supplemental line in proper position above the main line, I find it desirable to use, at the joints at least, surrounding cowls $m$, which fit over both lines and extend down on both sides of the main line. These cowls may be formed of sheet metal, and it is not necessary that they fit sufficiently tight around the pipes to prevent the escape of gas through the ends thereof, as they will simply act to prevent the entrance of dirt into the openings in the pipe at the parts covered, and thus insure free entrance of the gas into the supplemental line at the joints or couplings. Such cowls may, of course, be employed entirely along the line of tubing; but this is not necessary, as the natural course of the gas in rising from the main line where it escapes will be to the under surface of the supplemental line, and as it has free means of escape through the same it will naturally pass out through said supplemental line to the surface.

I am aware that a supplemental line of pipe called a "waste-gas-conducting pipe" situate several feet above the main, through which the gas is carried under pressure, in combination with several pipes leading from the waste-gas-pipe line down to a point adjacent to the main line, so that any gas escaping at the joint may pass into the vertical pipes, and thence into and through the waste-gas-pipe line to the exit, is not new, and I do not desire to claim the same.

It will be observed that in my improvement the supplemental line of pipe is situate adjacent to the main; that the vertical pipes are dispensed with, and that the supplemental pipe is provided with numerous perforations throughout its length, as is hereinbefore fully described.

What I claim as my invention, and desire to secure by Letters Patent, is—

1. In combination with a pipe-line for carrying gas under pressure, a supplemental pipe-line independent therefrom and above and close to the same, said supplemental line having perforations to permit the entrance of escaping gas, and suitable vent-pipes leading to the surface of the ground.

2. In combination with a pipe-line for carrying gas under pressure, a supplemental pipe-line having perforations therein, said supplemental line being formed in short sections extending above and close to the main line, and each section being provided with a separate vent-pipe leading to the surface of the ground.

3. In combination with a pipe-line for carrying gas under pressure, the supplemental pipe-line having perforations therein to permit the entrance of gas escaping from the main line, and cowls extending over both lines at the joints, substantially as and for the purposes set forth.

In testimony whereof I, the said KENNEDY H. STIVASON, have hereunto set my hand.

KENNEDY H. STIVASON.

Witnesses:
D. B. HEINER,
T. B. FAULKE.